United States Patent
Jung et al.

(10) Patent No.: US 11,204,253 B2
(45) Date of Patent: *Dec. 21, 2021

(54) METHOD AND APPARATUS FOR DISPLAYING VIRTUAL ROUTE

(71) Applicant: Samsung Electronics Co., Ltd., Suwon-si (KR)

(72) Inventors: Kyungboo Jung, Seoul (KR); Nahyup Kang, Seoul (KR); KeeChang Lee, Seongnam-si (KR); Sunghoon Hong, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/910,942

(22) Filed: Jun. 24, 2020

(65) Prior Publication Data

US 2020/0333159 A1      Oct. 22, 2020

Related U.S. Application Data

(63) Continuation of application No. 15/919,432, filed on Mar. 13, 2018, now Pat. No. 10,732,004.

(30) Foreign Application Priority Data

Nov. 9, 2017   (KR) .................. 10-2017-0148756

(51) Int. Cl.
*G01C 21/36* (2006.01)
*G06T 19/00* (2011.01)
(Continued)

(52) U.S. Cl.
CPC ......... *G01C 21/3635* (2013.01); *G01C 21/32* (2013.01); *G01C 21/3602* (2013.01);
(Continued)

(58) Field of Classification Search
CPC .................................................. G01C 21/3635
See application file for complete search history.

(56) References Cited

U.S. PATENT DOCUMENTS 8,406,992 B2 * 3/2013 Laumeyer .............. G01C 21/30
701/400
8,838,381 B1 * 9/2014 Daily .................... G06T 19/003
701/436
(Continued)

FOREIGN PATENT DOCUMENTS

EP    3 106 838 A2    12/2016
JP    10-170282 A    6/1998
(Continued)

OTHER PUBLICATIONS

Extended European Search Report dated Nov. 29, 2018 corresponding European Application No. 18167903.6 (9 Pages in English).

*Primary Examiner* — Alex C Dunn
(74) *Attorney, Agent, or Firm* — NSIP Law

(57) ABSTRACT

A method and apparatus for displaying a virtual route estimates a position of a vehicle based on sensing data received asynchronously from sensors, and outputs a three-dimensional (3D) virtual route generated by registering a driving environment model corresponding to a driving environment of the vehicle and the position of the vehicle in map information.

32 Claims, 17 Drawing Sheets

(51) Int. Cl.
  *G01C 21/32* (2006.01)
  *G06F 16/29* (2019.01)
  *G06T 15/20* (2011.01)

(52) U.S. Cl.
  CPC ........... *G01C 21/365* (2013.01); *G06F 16/29* (2019.01); *G06T 15/20* (2013.01); *G06T 19/006* (2013.01); *G06T 2215/16* (2013.01)

(56) References Cited

U.S. PATENT DOCUMENTS

| | | | |
|---|---|---|---|
| 9,520,106 B2 * | 12/2016 | An | G09G 5/14 |
| 9,983,018 B2 * | 5/2018 | Ko | G01C 21/3602 |
| 9,997,074 B2 * | 6/2018 | Kim | B60W 30/09 |
| 10,240,937 B2 * | 3/2019 | Chung | B60K 35/00 |
| 2008/0082263 A1 | 4/2008 | Chauncey et al. | |
| 2008/0195315 A1 * | 8/2008 | Hu | G01C 21/3647 |
| | | | 701/455 |
| 2009/0005961 A1 * | 1/2009 | Grabowski | G02B 27/01 |
| | | | 701/532 |
| 2009/0210143 A1 * | 8/2009 | Seltzer | G01C 21/28 |
| | | | 701/532 |
| 2010/0253489 A1 | 10/2010 | Cui et al. | |
| 2012/0109513 A1 * | 5/2012 | Belimpasakis | G06T 15/20 |
| | | | 701/418 |
| 2013/0085666 A1 | 4/2013 | Zhang et al. | |
| 2014/0232746 A1 * | 8/2014 | Ro | G02B 30/26 |
| | | | 345/633 |
| 2014/0277939 A1 * | 9/2014 | Ren | G01C 21/3638 |
| | | | 701/36 |
| 2015/0331487 A1 | 11/2015 | Roth et al. | |
| 2016/0061622 A1 * | 3/2016 | Ren | G01C 21/3638 |
| | | | 701/533 |
| 2016/0140729 A1 | 5/2016 | Soatto et al. | |
| 2016/0307363 A1 * | 10/2016 | Zou | G06T 15/005 |
| 2016/0349066 A1 * | 12/2016 | Chung | G01C 21/3658 |
| 2017/0050590 A1 * | 2/2017 | List | B60W 40/12 |
| 2017/0256167 A1 * | 9/2017 | Kim | G08G 1/166 |
| 2017/0268948 A1 * | 9/2017 | List | G01M 17/007 |
| 2017/0309072 A1 * | 10/2017 | Li | G06F 3/0488 |
| 2018/0005434 A1 * | 1/2018 | Ren | G06T 15/205 |
| 2018/0053343 A1 * | 2/2018 | Ren | G06T 11/001 |
| 2018/0089901 A1 * | 3/2018 | Rober | G06T 19/006 |
| 2019/0080612 A1 * | 3/2019 | Weissman | G08G 1/164 |
| 2019/0088006 A1 * | 3/2019 | Yamamoto | H04N 7/181 |

FOREIGN PATENT DOCUMENTS

| | | |
|---|---|---|
| JP | 2010-276527 A | 12/2010 |
| KR | 10-0196725 B1 | 6/1999 |

* cited by examiner

1115

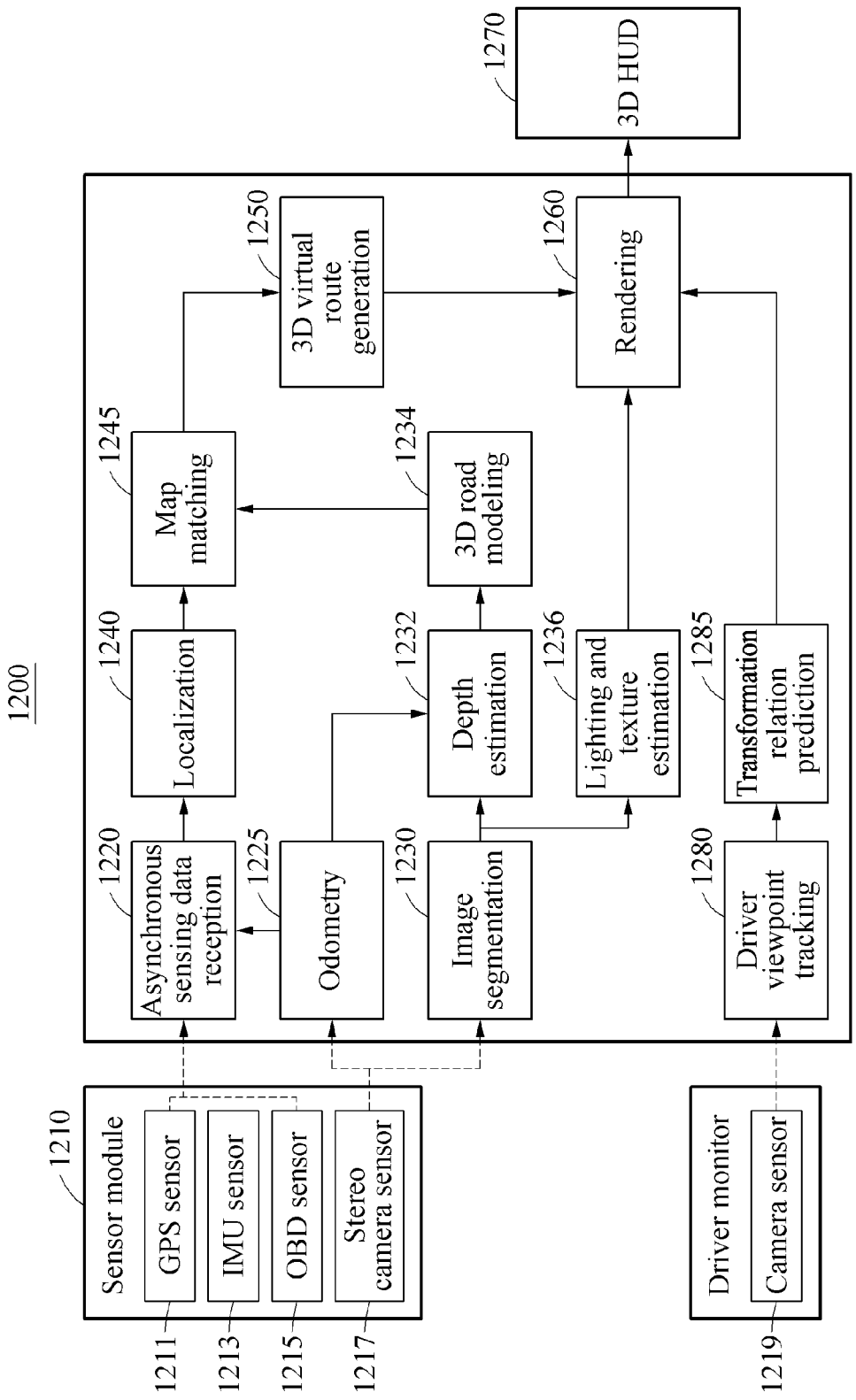

METHOD AND APPARATUS FOR DISPLAYING VIRTUAL ROUTE

CROSS-REFERENCE TO RELATED APPLICATIONS

This application is a continuation of U.S. patent application Ser. No. 15/919,432 filed on Mar. 13, 2018 which claims the benefit under 35 USC § 119(a) of Korean Patent Application No. 10-2017-0148756 filed on Nov. 9, 2017 in the Korean Intellectual Property Office, the entire disclosure of which is incorporated herein by reference for all purposes.

BACKGROUND

1. Field

The following description relates to a method and apparatus for displaying a virtual route.

2. Description of Related Art

To assist drivers, augmented reality (AR) representing a variety of visual information may be provided through displays or navigation systems included in the vehicles. For example, a two-dimensional (2D) head-up display (HUD) based navigation device requests a user to directly perform registration between route information to be displayed and actual driving information, or displays a virtual image at a fixed position. Thus, it may be difficult to provide correct directions, or the virtual image may be a risk element during driving. A three-dimensional (3D) HUD based navigation system determines spatial information of a road or a vehicle, and thus, may augment a route based on an actual driving environment. However, the position of an eye of the user may vary and depending on the position of the eye of the user an error may occur at a position at which a 3D virtual route is augmented.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of displaying a virtual route including estimating a position of a vehicle based on sensing data received asynchronously from sensors, generating a three-dimensional (3D) virtual route by registering a driving environment model corresponding to a driving environment of the vehicle and the position of the vehicle in map information, and outputting the 3D virtual route.

The sensors may include any one or any combination of a global positioning system (GPS) sensor, an inertial measurement unit (IMU) sensor, an on-board diagnostics (OBD) sensor, and a camera sensor.

The sensing data may be sampled separately for each of the sensors.

The estimating may include inserting, into each piece of the sensing data, information related to a processing time at which the corresponding piece of the sensing data is processed, and estimating the position of the vehicle based on the sensing data, each including the information related to the processing time.

The estimating may include estimating a first position of the vehicle based on first sensing data received at a first time from a first sensor of the sensors, updating the first position of the vehicle to a second position based on second sensing data received at a second time from the first sensor or a second sensor of the sensors, and updating the second position of the vehicle to a third position based on third sensing data received at a third time from the first sensor, or the second sensor or a third sensor of the sensors.

The method may include measuring an odometry based on image data acquired from a camera sensor among the sensors, wherein the estimating comprises estimating the position of the vehicle based on the sensing data and the odometry.

The estimating based on the sensing data and the odometry comprises estimating the position of the vehicle based on one piece of the sensing data, except for the image data, and correcting the position of the vehicle based on the odometry.

The generating of the 3D virtual route may include generating a segmentation image based on image data acquired from a camera sensor among the sensors, detecting objects included in the segmentation image, generating the driving environment model based on depth values of the objects and a driving lane of the vehicle identified from the objects, and generating the 3D virtual route by registering the driving environment model and the position of the vehicle in the map information.

The generating of the 3D virtual route may include estimating a lighting and a texture of a region including a driving lane of the vehicle based on image data acquired from a camera sensor among the sensors, and generating the 3D virtual route by applying the lighting and the texture.

The method may include transforming the 3D virtual route to match to a viewpoint of a driver of the vehicle, wherein the outputting may include displaying the transformed 3D virtual route.

The outputting of the transformed 3D virtual route may include displaying the transformed 3D virtual route through a head-up display (HUD) of the vehicle.

The transforming may include tracking the viewpoint of the driver by tracking 3D positions of both eyes of the driver, predicting a transformation relation between the viewpoint of the driver and a virtual image displayed through the HUD based on the 3D positions of both the eyes of the user, and transforming the 3D virtual route based on the transformation relation.

In one general aspect, there is provided an apparatus for displaying a virtual route, the apparatus including a sensor module including sensors configured to sense sensing data including an image of a driving environment of a vehicle, a posture of the vehicle, and a position of the vehicle, a memory configured to store map information, a processor configured to estimate the position of the vehicle based on the sensing data received asynchronously from the sensors, and to generate a three-dimensional (3D) virtual route by registering a driving environment model corresponding to the driving environment of the vehicle and the position of the vehicle in the map information, and a display configured to display the 3D virtual route.

The sensors may include at least two or more of a global positioning system (GPS) sensor configured to measure an absolute route of the vehicle, an inertial measurement unit (IMU) sensor configured to measure a relative route of the vehicle, an on-board diagnostics (OBD) sensor configured to measure a driving distance of the vehicle, and a camera sensor configured to capture image data including the driving environment of the vehicle.

The sensing data may be sampled separately for each of the sensors.

The processor may be configured to insert, into each piece of the sensing data, information related to a processing time at which the corresponding piece of the sensing data is processed, and to estimate the position of the vehicle based on the sensing data, each including the information related to the processing time.

The processor may be configured to estimate a first position of the vehicle based on first sensing data received at a first time from a first sensor of the sensors, to update the first position of the vehicle to a second position based on second sensing data received at a second time from the first sensor or a second sensor of the sensors, and to update the second position of the vehicle to a third position based on third sensing data received at a third time from the first sensor, or the second sensor or a third sensor of the sensors.

The processor may be configured to measure an odometry based on image data acquired from a camera sensor among the sensors, and to estimate the position of the vehicle based on the sensing data and the odometry.

The processor may be configured to estimate the position of the vehicle based on one piece of the sensing data, except for the image data, and to correct the position of the vehicle based on the odometry.

The processor may be configured to generate a segmentation image based on image data acquired from a camera sensor among the sensors, to detect objects included in the segmentation image, to generate the driving environment model based on depth values of the objects and a driving lane of the vehicle identified from the objects, and to generate the 3D virtual route by registering the driving environment model and the position of the vehicle in the map information.

The processor may be configured to estimate a lighting and a texture of a region including a driving lane of the vehicle based on image data acquired from a camera sensor among the sensors, and transform the 3D virtual route based on the lighting and the texture.

The apparatus may include a second camera sensor configured to track a viewpoint of a driver of the vehicle, the processor may be configured to transform the 3D virtual route to match the viewpoint of the driver of the vehicle, and to output the transformed 3D virtual route through the display.

The display includes a head-up display (HUD).

The processor may be configured to track the viewpoint of the driver of the vehicle by tracking 3D positions of both eyes of the driver, to predict a transformation relation between the viewpoint of the driver and a virtual image displayed through the HUD based on the 3D positions of both the eyes of the user, and to transform the 3D virtual route based on the transformation relation.

Each of the sensors may separately sense the position or posture of the vehicle and the sensing speed of the each of the sensors may not be synchronized.

In one general aspect, there is provided a virtual route display apparatus including a sensor module including sensors configured to asynchronously generate sensing data including an image of a driving environment of a vehicle, a viewpoint of a driver of the vehicle based on tracking 3D positions of both eyes of a driver of the vehicle, a posture of the vehicle, and a position of the vehicle, a head-up display (HUD), a memory configured to store map information and instructions, and a processor configured to execute the instructions to estimate the position of the vehicle based on the sensing data received asynchronously from the sensors, generate a three-dimensional (3D) virtual route by registering a driving environment model corresponding to the driving environment of the vehicle and the position of the vehicle in the map information, transform the 3D virtual route to match the viewpoint of the driver of the vehicle, and output the transformed 3D virtual route through the HUD.

The memory may be configured to store the sensing data generated by the sensor module and the 3D virtual route generated by the processor.

Other features and aspects will be apparent from the following detailed description, the drawings, and the claims.

BRIEF DESCRIPTION OF THE DRAWINGS

FIG. 12 illustrates an example of a process flow of an apparatus for displaying a virtual route.

Figure 1:
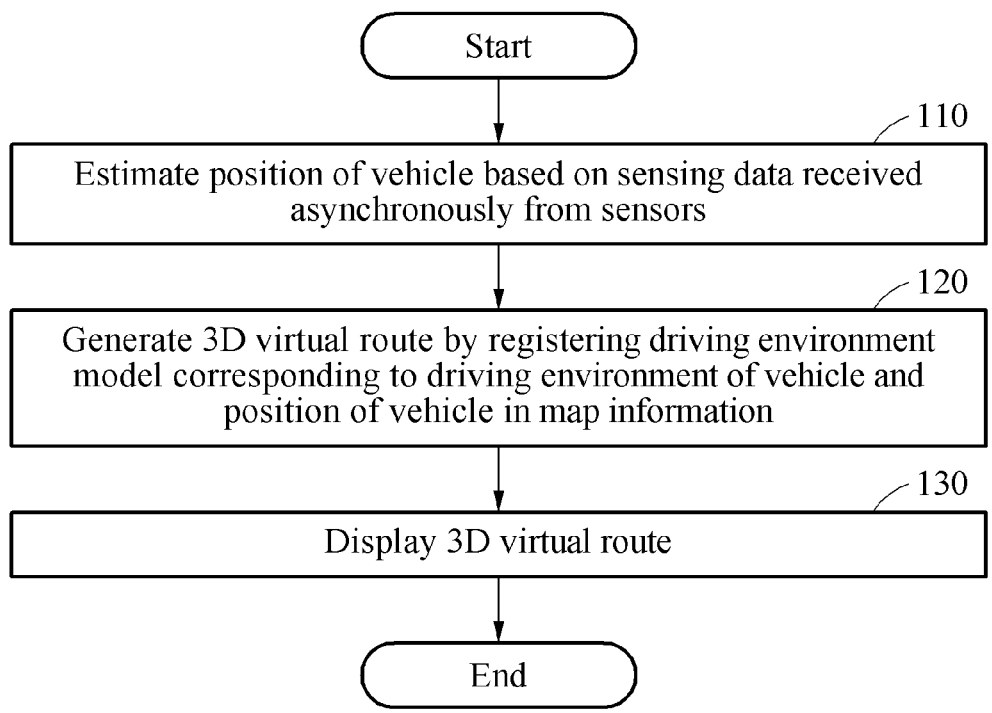
FIG. 1 illustrates an example of a method of displaying a virtual route.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise.

Examples set forth hereinafter may be used to display a virtual route or generate visual information to assist steering of an autonomous vehicle in an augmented reality (AR) navigation system of a smart vehicle. The examples may be used to interpret visual information and assist safe and pleasant driving in a device including an intelligent system such as a head-up display (HUD) installed for driving assistance or fully autonomous driving of a vehicle. The examples may be applied to, for example, an autonomous vehicle, an intelligent vehicle, a smart phone, and a mobile device. Hereinafter, the examples will be described in detail with reference to the accompanying drawings, wherein like drawing reference numerals are used for like elements.

FIG. 1 illustrates an example of a method of displaying a virtual route. The operations in FIG. 1 may be performed in the sequence and manner as shown, although the order of some operations may be changed or some of the operations omitted without departing from the spirit and scope of the illustrative examples described. Many of the operations shown in FIG. 1 may be performed in parallel or concurrently. One or more blocks of FIG. 1, and combinations of the blocks, can be implemented by special purpose hardware-based computer that perform the specified functions, or combinations of special purpose hardware and computer instructions.

Referring to FIG. 1, in operation 110, an apparatus for displaying a virtual route, hereinafter, the "display apparatus", estimates a position of a vehicle based on sensing data received asynchronously from sensors. In an example, vehicle described herein refers to any mode of transportation, delivery, or communication such as, for example, an automobile, a truck, a tractor, a scooter, a motorcycle, a cycle, an amphibious vehicle, a snowmobile, a boat, a public transit vehicle, a bus, a monorail, a train, a tram, an autonomous or automated driving vehicle, an intelligent vehicle, a self-driving vehicle, an aircraft, an unmanned aerial vehicle, a drone, or a mobile device. In an example, the position estimating apparatus is applicable to a robot requiring a positioning operation.

The apparatus and methods described herein may be used to estimate a position of a target in a navigation system of a smart vehicle, to generate location information to assist an autonomous or automated driving vehicle in steering, for in-vehicle driving assistance for fully autonomous or automated driving, and thus, enable safer and more comfortable driving.

The sensors described herein include, for example, a global positioning system (GPS) sensor, an inertial measurement unit (IMU) sensor, an on-board diagnostics (OBD) sensor, and a camera sensor. The IMU sensor includes, for example, an acceleration sensor, and/or a gyro sensor. In an example, the display apparatus estimates a three-dimensional (3D) position and a posture of the vehicle by integrating a motion acceleration component calculated based on an angular velocity, a gravitational acceleration, and a motion sensed through the acceleration sensor or the gyro sensor. The camera sensor is, for example, an omnidirectional camera, a stereo camera, or a mono camera. In an example, the sensing data received from the sensors are sampled separately for each of the sensors.

In an example, the sensors include an ultrasonic sensor. The display apparatus calculates a distance by measuring a time of flight (TOF) of an ultrasonic wave travelling from a sender of the ultrasonic sensor to a receiver of the ultrasonic sensor, considering that the speed of sound in the air is about 340 meters per second (m/s). The display apparatus obtains distance information through a method, such as, triangulation method based on acquiring three or more same-time distance information, and calculates the 3D position of the vehicle.

In an example, the display apparatus is an intelligent vehicle, an AR navigation system or an intelligent device including an HUD, or a separate apparatus included in the intelligent vehicle or the intelligent device. The display apparatus is, for example, a display apparatus 1500 of FIG. 15. Examples of the display apparatus for estimating the position of the vehicle will be described further with reference to FIGS. 2 through 5. However, the display apparatus is not limited to the example described in the forgoing, and any other instrument cluster, vehicular infotainment system, screen in the vehicle that uses augmented reality, or display panel in the vehicle may perform the function of the display apparatus. Other displays, such as, for example, smart phone and eye glass display (EGD) that are operatively connected to the display apparatus may be used without departing from the spirit and scope of the illustrative examples described.

In operation 120, the display apparatus generates a 3D virtual route by registering a driving environment model corresponding to a driving environment of the vehicle and the estimated position of the vehicle in map information. In an example, the "driving environment model" is a model of a driving environment including a driving road on which the vehicle is being driven, a sidewalk, a building, and a pedestrian. The road includes, for example, driving lanes, lines, and road signs. The driving road includes, for example, a driving lane, lane lines, and road signs. The driving environment model is a 2D model or a 3D model.

Herein, the term "road" refers to a path on which vehicles travel, and includes various types of roads such as, for example, a highway, a national road, a local road, a country road, a farm road, a village road, an expressway, and a motorway. In an example, the road includes one or more lanes. The term "lane" refers to a road space distinguished by lines marked on a surface of the road. The term "driving lane" refers to a lane on which the vehicle is being driven, among multiple lanes, i.e., a road space being occupied and used by the vehicle. A single lane is distinguished by left and right lines thereof. The "lines" are various types of lines, for example, solid lines or broken lines marked in colors, such as white, blue or yellow on the surface of the road.

Figure 15:
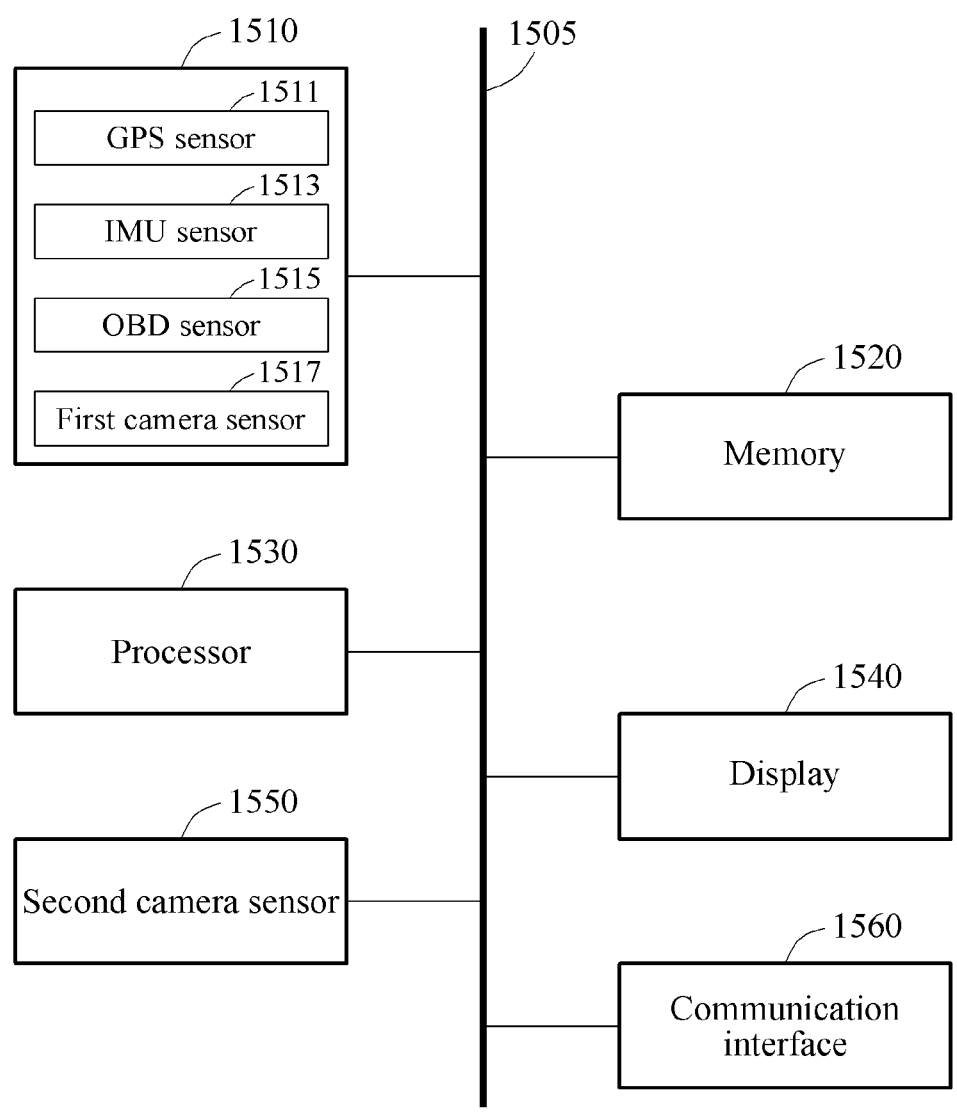
FIG. 15 illustrates an example of an apparatus for displaying a virtual route.

The map information is pre-stored in a memory 1520 of FIG. 15, or received from an external database at preset intervals or in real time.

The display apparatus extracts road shape information from the map information, and registers or matches the driving environment model and the estimated position of the vehicle in or to the road shape information, thereby generating the 3D virtual route. The display apparatus extracts the road shape information coming in a viewing frustum of a camera from the map information, based on camera information and position information included in a driving image. The road shape information is 2D information expressed by latitude and longitude, or 3D information expressed by a series of (x, y, z) components. In an example, the road shape information is line marking information such as white, yellow and blue, a center line of the road that passes a center of the road, or information related to the surface of the road. The display apparatus matches the road shape information to the driving environment model using, for example, a least square method (LSM). The display apparatus matches a route to be provided to a driver to an actual road by registering the driving environment model and the position of the vehicle in the map information, thereby providing a user with correct route information through the AR navigation system.

Figure 10A:
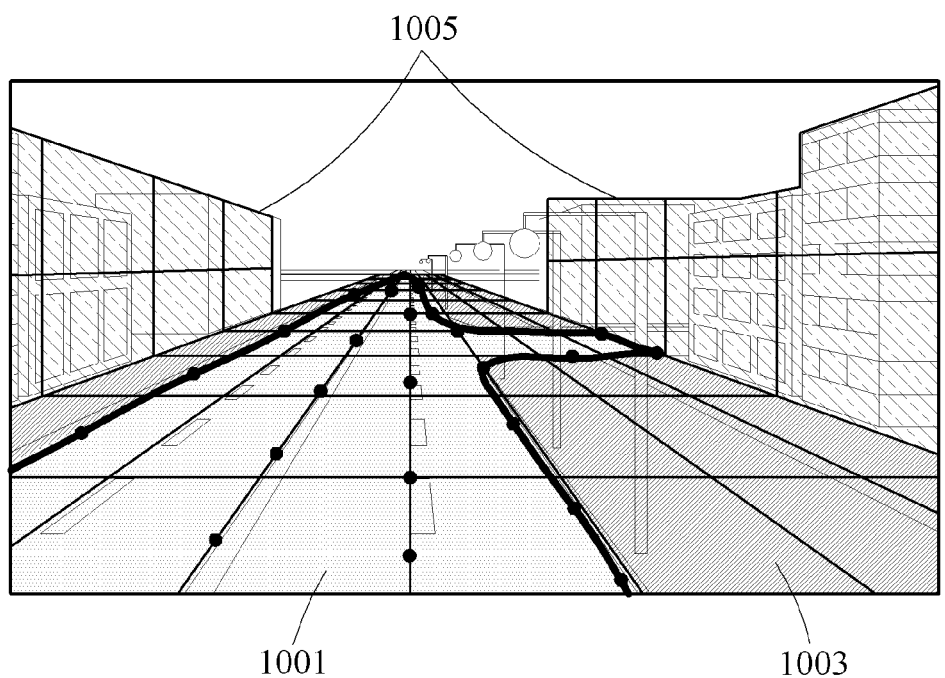
FIGS. 10A and 10B illustrate an example of a 3D virtual route generated based on a driving environment model and an estimated position of a vehicle.
Figure 10B:
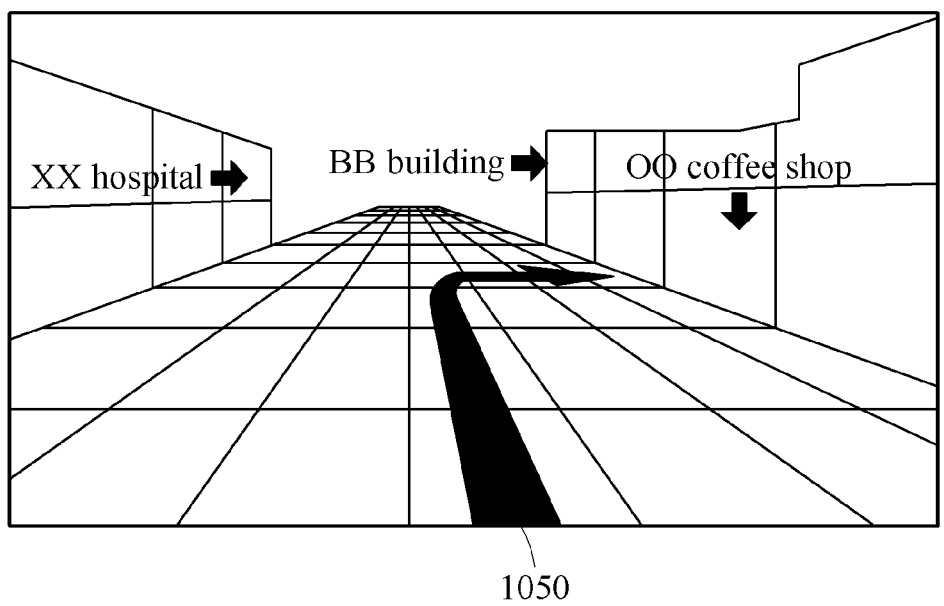

The 3D virtual route is an AR object to be displayed through the AR navigation system. An example of the display apparatus generating the 3D virtual route will be described further with reference to FIGS. 6 and 7. An example of the generated 3D virtual route is illustrated in FIGS. 10A and 10B.

In operation 130, the display apparatus displays the generated 3D virtual route. The display apparatus displays the 3D virtual route through, for example, the HUD. An example of the display apparatus displaying the 3D virtual route will be described further with reference to FIGS. 8 and 9.

Figure 2:
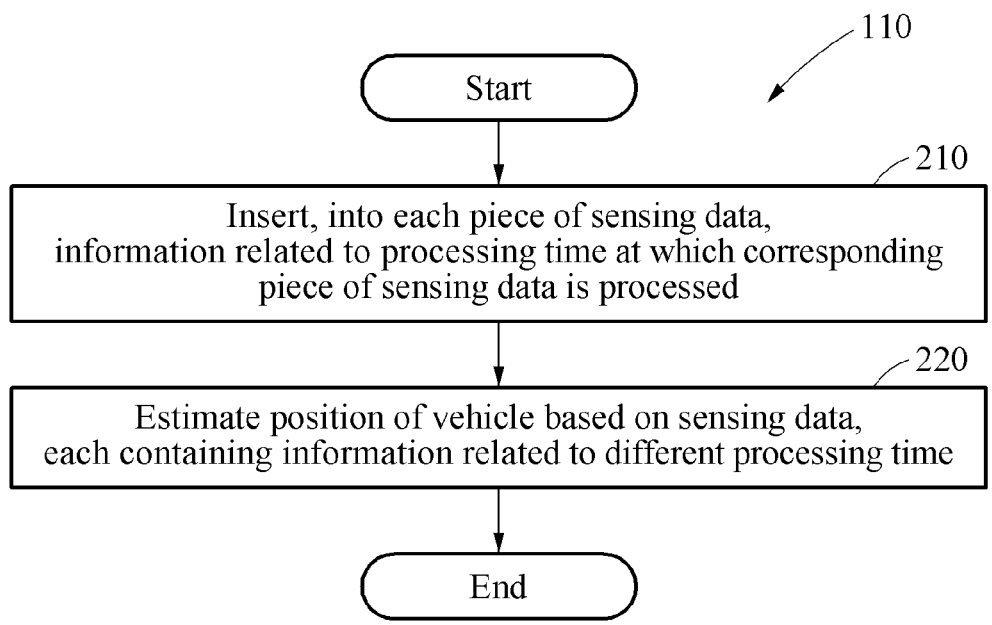
FIGS. 2 through 5 illustrate examples of estimating a position of a vehicle.

FIG. 2 illustrates an example of estimating a position of a vehicle. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here.

Referring to FIG. 2, in operation 210, the display apparatus inserts, into each piece of sensing data, information related to a processing time at which the corresponding piece of the sensing data is processed. In this example, the processing time at which the corresponding piece of the sensing data is processed refers to a time at which the corresponding piece of the sensing data is completely processed to data of a form that may be used by the display apparatus after the corresponding piece of the sensing data is sensed. The information related to the processing time is inserted into each piece of the sensing data in a form of, for example, a tag or a code.

In operation 220, the display apparatus estimates a position of a vehicle based on the sensing data, each including the information related to a different processing time. In this example, the position of the vehicle further includes a posture of the vehicle. In an example, the display apparatus estimates position information and posture information of the vehicle at a current time by integrating position information and posture information of the vehicle estimated based on first sensing data sensed by a sensor A at the current time and second sensing data sensed by a sensor B at a previous time.

In an example, each piece of sensing data sensed by various sensors includes information related to a processing time at which the sensing data is processed in a form of a tag or a code. In this example, the processing time at which the corresponding piece of the sensing data is processed refers to a time at which the corresponding piece of the sensing data is completely processed to be a data in a form that may be used, and is construed as information related to time such as 2:01:05 or 2:02:17 from which a temporal order of the corresponding piece of data may be verified.

In an example, using the "information related to a processing time at which the corresponding piece of the sensing data is processed" is used to estimate the position of the vehicle. In an example, means estimating the position information and posture information of the vehicle is estimated at a current time by integrating position information and posture information of the vehicle estimated based on first sensing data sensed by a sensor A at the current time (PM 1:30:20) and second sensing data sensed by a sensor B at a previous time (PM 1:25:00).

Figure 3:
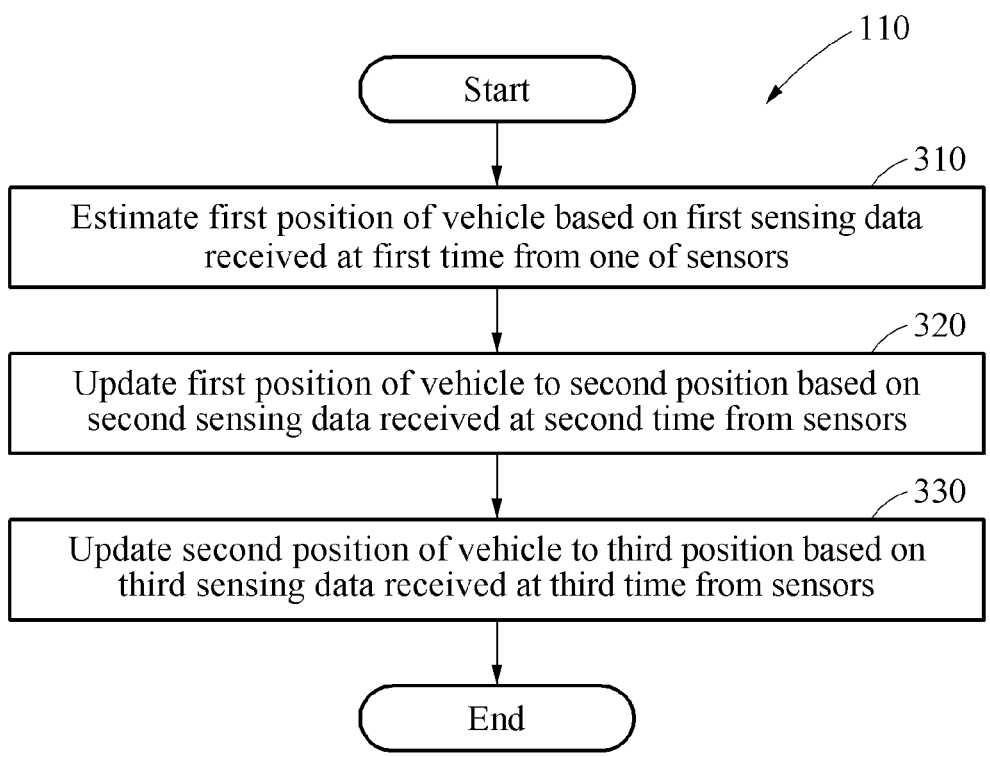

FIG. 3 illustrates an example of estimating a position of a vehicle. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. In addition to the description of FIG. 3 below, the descriptions of FIGS. 1-2 are also applicable to FIG. 3, and are incorporated herein by reference. Thus, the above description may not be repeated here.

Referring to FIG. 3, in operation 310, the display apparatus estimates a first position of a vehicle based on first sensing data received at a first time from one of sensors.

In operation 320, the display apparatus updates the first position of the vehicle to a second position based on second sensing data received at a second time from the sensors including the one sensor. In this example, the first sensing data and the second sensing data are sensed by the same sensor or by different sensors.

In operation 330, the display apparatus updates the second position of the vehicle to a third position based on third sensing data received at a third time from the sensors. In the same manner, the first sensing data, the second sensing data, and the third sensing data are sensed by the same sensor or by different sensors.

Figure 4:
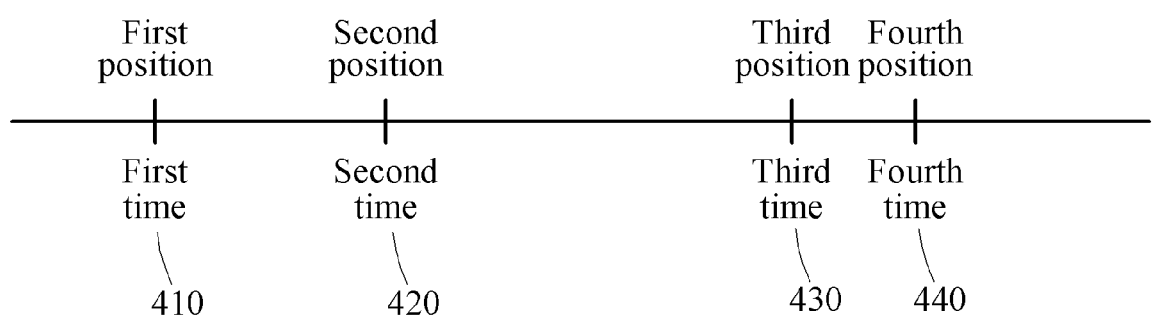

FIG. 4 illustrates an example of estimating a position of a vehicle. Referring to FIG. 4, first sensing data received at a first time 410, second sensing data received at a second time 420, third sensing data received at a third time 430, and fourth sensing data received at a fourth time 440 are illustrated. The first through fourth sensing data are received asynchronously from the same sensor or from different sensors.

For example, the first sensing data and the second sensing data are sensed by a GPS sensor, and the third sensing data and the fourth sensing data are sensed by an OBD sensor.

The display apparatus estimates a first position of a vehicle based on the first sensing data, and updates the first position to a second position based on the second sensing data. The display apparatus updates the second position to a third position based on the third sensing data, and updates the third position to a fourth position based on the fourth sensing data.

The GPS sensor measures an absolute route of the vehicle with a frequency of 1 hertz (Hz). However, in a GPS shadow area, the GPS sensor barely measures the absolute route, and a position error of about 10 meters may occur. An IMU sensor or the OBD sensor measures a relative route of the vehicle with a high frequency of 50 Hz or 100 Hz. However, the accuracy of measurement is relatively low.

In an example, sensing speeds of sensors are not synchronized, and each sensor separately senses the position of the vehicle and/or the posture of the vehicle. The position of the vehicle is updated without delay by integrating the position and/or the posture of the vehicle estimated from current sensing data and past sensing data, whereby the position of the vehicle is estimated more accurately. In addition, the position of the vehicle is estimated relatively accurately without having to use relatively high computing power to synchronize the sensing speeds of the sensors in response to asynchronous reception of the sensing data.

In an example, the display apparatus updates the position of the vehicle from the third position to the fourth position when a position difference between the fourth position of the vehicle estimated based on the current sensing data, for example, the sensing data received at the fourth time 440, and the third position of the vehicle estimated based on the previous sensing data, for example, the sensing data received at the third time 430 is greater than or equal to a threshold. When the position difference is less than the threshold, the display apparatus maintains the third position, rather than updating the position of the vehicle to the fourth position.

Figure 5:
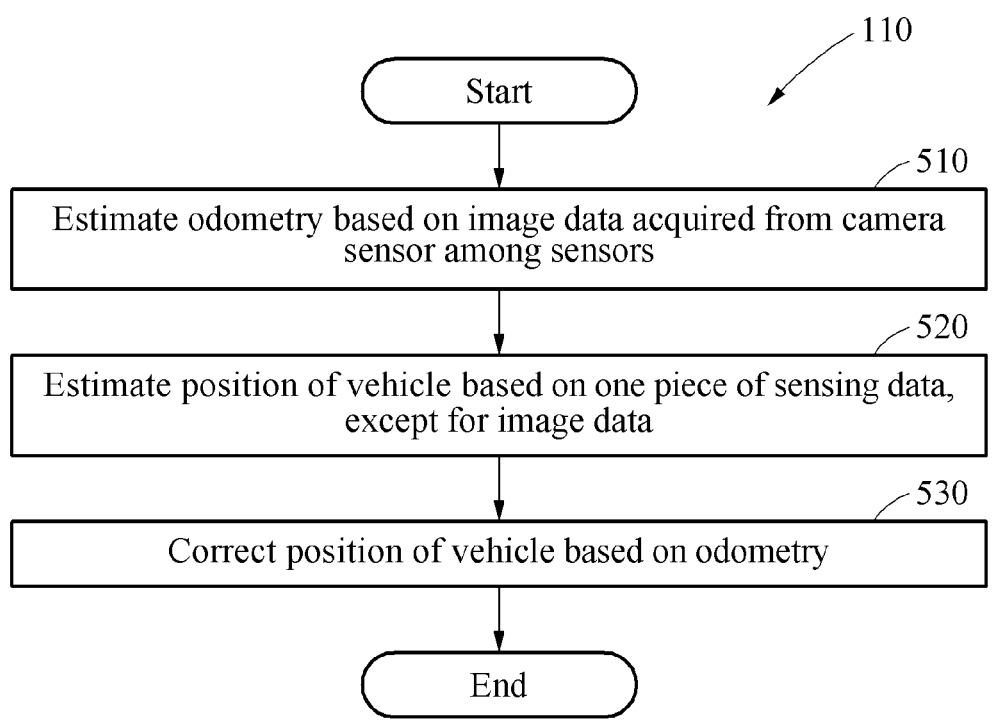

FIG. 5 illustrates an example of estimating a position of a vehicle. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer that perform the specified functions, or combinations of special purpose hardware and computer instructions. In addition to the description of FIG. 5 below, the descriptions of FIGS. 1-4 are also applicable to FIG. 5, and are incorporated herein by reference. Thus, the above description may not be repeated here.

Referring to FIG. 5, in operation 510, the display apparatus measures an odometry based on image data acquired from sensor, such as a camera sensor. A method of measuring the odometry includes a process of determining a position and a direction of a target object, for example, a vehicle or a robot, by analyzing camera images.

The method of measuring the odometry is a process of determining measurement information of a corresponding driving distance using successive camera images to estimate a driving distance of the vehicle, and thus improves a steering accuracy of the vehicle using all types of motion schemes irrespective of surfaces. An example of measuring the odometry is as follows.

The display apparatus acquires the camera images, for example, the image data, using a mono camera, a stereo camera or an omnidirectional camera, and corrects the camera images by applying image processing to remove lens distortion. In an example, the display apparatus defines an interest operator, and establishes a correlation of extracted features matching over frames of the camera images to construct an optical flow field. In an example, the display apparatus detects the features from the camera images using the optical flow field. In this example, the display apparatus uses the correlation to set a relation between two of the successive camera images.

In an example, the display apparatus estimates a motion of the camera using an optical flow filter. In this example, the display apparatus estimates the motion of the camera using a Kalman filter, or estimates the motion of the camera by detecting a geometric property or a 3D property of a function that minimizes a cost function based on a reprojection error between two adjacent images. The motion of the camera is estimated through a mathematical minimization or random sampling.

The display apparatus measures the odometry by periodically checking a tracking point to maintain an application range through the adjacent images.

The display apparatus estimates the position of the vehicle based on the sensing data and the odometry. In operation 520, the display apparatus estimates the position of the vehicle based on one piece of the sensing data, except for the image data.

In operation 530, the display apparatus corrects the position of the vehicle based on the odometry.

Figure 6:
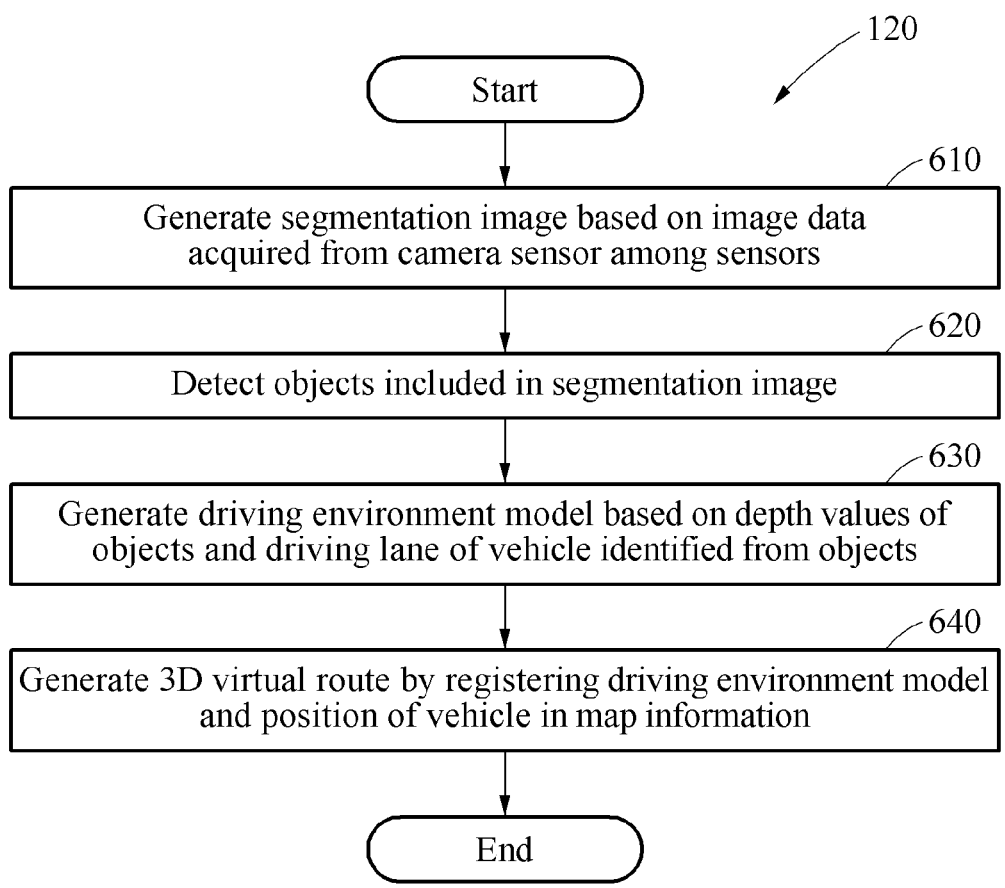
FIGS. 6 and 7 illustrate examples of generating a three-dimensional (3D) virtual route.

FIG. 6 illustrates an example of generating a 3D virtual route. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer that perform the specified functions, or combinations of special purpose hardware and computer instructions. In addition to the description of FIG. 6 below, the descriptions of FIGS. 1-5 are also applicable to FIG. 6, and are incorporated herein by reference. Thus, the above description may not be repeated here.

Referring to FIG. 6, in operation 610, the display apparatus generates a segmentation image based on image data acquired from a sensor, such as a camera sensor. In an example, the image data is a driving image acquired from the camera sensor mounted on a vehicle. The driving image includes, for example, a color image captured by the camera sensor, a black-and-while image, and camera information. The camera information includes an intrinsic parameter and an extrinsic parameter of the camera. The driving image includes, for example, an image including a surrounding environment such as a vehicle, a lane, a road, a curb, a sidewalk and a building, and a road surface image.

The display apparatus classifies an object in a semantic unit from the image data or the driving image, determines a meaning of the classified object, for example, region, in a pixel unit, and labels each class with the meaning, thereby generating the segmentation image. In an example, there are about 20 classes such as, for example, a road, a vehicle, a sideway, a person, an animal, the sky, and a building. In an example, the display apparatus is able to precisely verify where and how constituent elements, for example, an object and a background, exist in an image from a label of the pixel unit included in the segmentation image. Further, the display apparatus classifies the constituent elements included in the segmentation image using a convolutional neural network (CNN), a deep neural network (DNN) or a support vector machine (SVM) that is trained in advance. For example, the display apparatus classifies objects included in the image data in semantic units, thereby generating a segmentation image as shown in FIG. 10A.

In operation 620, the display apparatus detects objects included in the segmentation image.

In operation 630, the display apparatus generates a driving environment model based on depth values of the objects and a driving lane of the vehicle identified from the objects. In this example, the depth values of the objects are obtained through, for example, simultaneous localization and mapping (SLAM), or stereo matching using a radar, a Light Detection and Ranging (LIDAR) or a stereo camera. In an example, the radar detects an object and measures a distance to the object using radio waves. In an example, the LIDAR measures temperature, humidity, and visibility in the air by illuminating a target with a laser light and using the reflected and absorbed light. The display apparatus obtains the depth values through stereo matching using a stereo camera.

In operation 640, the display apparatus generates a 3D virtual route, for example, as shown in FIG. 10B, by registering the driving environment model and the position of the vehicle in map information.

Figure 7:
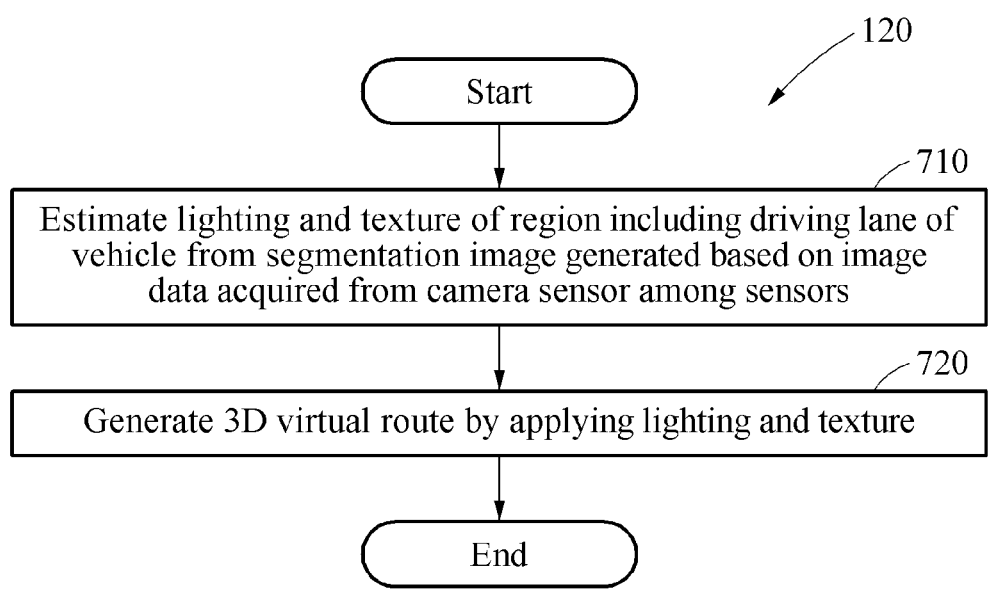

FIG. 7 illustrates an example of generating a 3D virtual route. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer that perform the specified functions, or combinations of special purpose hardware and computer instructions. In addition to the description of FIG. 7 below, the descriptions of FIGS. 1-6 are also applicable to FIG. 7, and are incorporated herein by reference. Thus, the above description may not be repeated here.

Referring to FIG. 7, in operation 710, the display apparatus estimates a lighting and a texture of a region including a driving lane of a vehicle based on image data acquired from a sensor, such as a camera sensor. The display apparatus estimates the lighting and the texture of the region in which a virtual image of an HUD is rendered from a segmentation image. In an example, the display apparatus estimates the lighting and the texture of the region including the driving lane of the vehicle from the segmentation image generated based on the image data.

An example of the display apparatus estimating the lighting and the texture is as follows.

In an example, the display apparatus extracts material information including various colors and textural features from a pair of a color image and a depth image, and simultaneously extracts an omnidirectional lighting map. The color image is, for example, a multi-view color image.

The display apparatus analyses textural features of an object, for example, a region including the driving lane of the vehicle, based on the color image, and divides the object into a plurality of segments based on the textural features. In an example, the display apparatus analyzes the textural features based on values of color difference signals except for brightness components, in a domain of a color space. The color space includes, for example, a hue saturation value (HSV), and a commission internationale d'eclairage (CIE) LAB model. The color difference signals include, for example, Cr and Cb (the blue-difference and red-difference chroma components). However, the types of the color difference signals are not limited thereto. The display apparatus determines a plurality of texture clusters by performing clustering based on the values of the color difference signals. The display apparatus expresses a texture of a surface of the object by applying the texture clusters to the object.

The display apparatus obtains texture constants with respect to the plurality of segments and lighting information related to the object using a low basis function induced from the depth image of the object and pixel values of the color image. An example of a scheme of representing an image using a low basis function model is a spherical harmonics basis function (SHBF) scheme. The display apparatus generates a low basis function model of the depth image from a normal map using the SHBF scheme. Here, the normal map expresses normal vectors with respect to the object using textures. The display apparatus restores all diverse colors and textures of the object using the texture constants with respect to the plurality of segments.

In operation 720, the display apparatus generates a 3D virtual route by applying the lighting and the texture.

Figure 8:
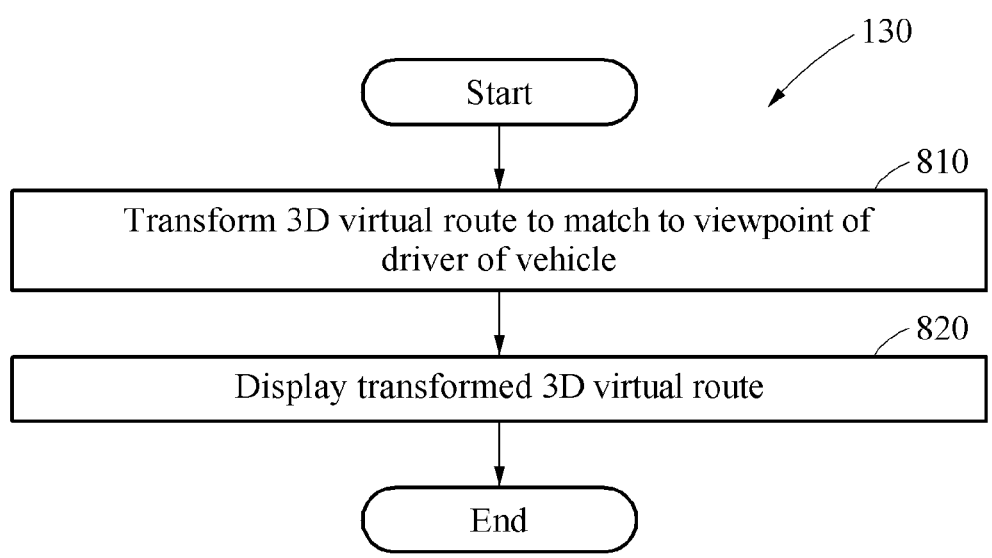
FIG. 8 illustrates an example of displaying a 3D virtual route.

FIG. 8 illustrates an example of displaying a 3D virtual route. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer that perform the specified functions, or combinations of special purpose hardware and computer instructions. In addition to the description of FIG. 7 below, the descriptions of FIGS. 1-7 are also applicable to FIG. 8, and are incorporated herein by reference. Thus, the above description may not be repeated here.

Referring to FIG. 8, in operation 810, the display apparatus transforms a 3D virtual route to match to a viewpoint of a driver of a vehicle. In an example, the transformation is construed as including "correction". An example of the display apparatus transforming the 3D virtual route will be described further with reference to FIG. 9.

In operation 820, the display apparatus displays the transformed 3D virtual route. The display apparatus displays the transformed 3D virtual route through an HUD of the vehicle. The HUD is, for example, a light field 3D display.

Figure 9:
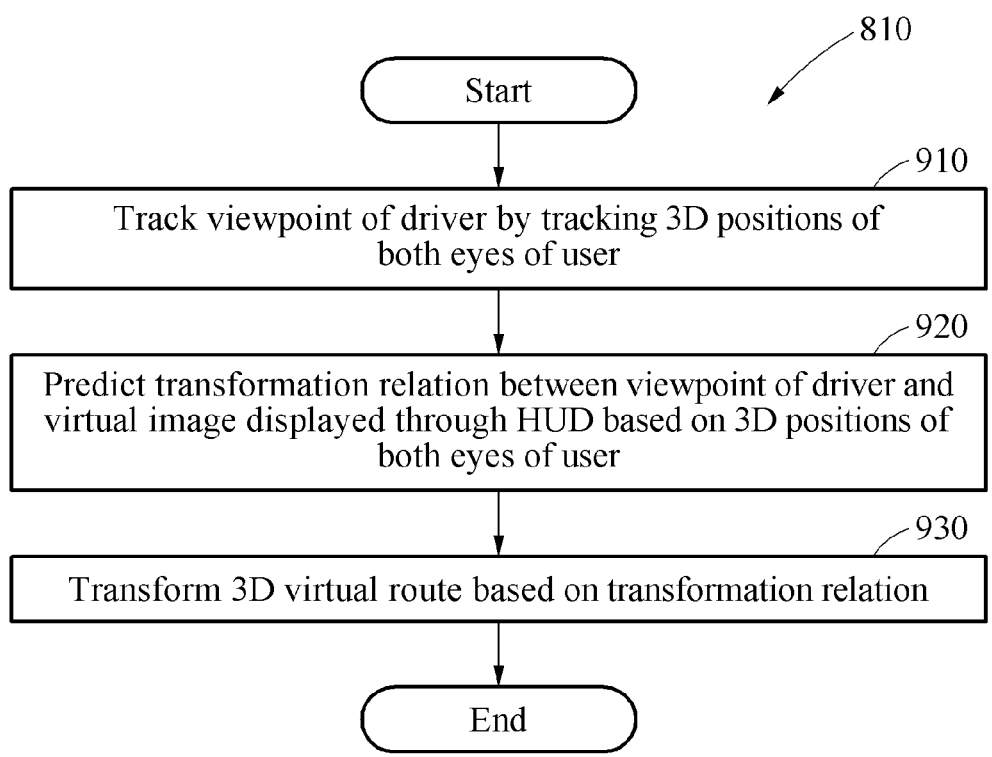
FIG. 9 illustrates an example of transforming a 3D virtual route.

FIG. 9 illustrates an example of transforming a 3D virtual route. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. One or more blocks of FIG. 9, and combinations of the blocks, can be implemented by special purpose hardware-based computer that perform the specified functions, or combinations of special purpose hardware and computer instructions. In addition to the description of FIG. 9 below, the descriptions of FIGS. 1-8 are also applicable to FIG. 9, and are incorporated herein by reference. Thus, the above description may not be repeated here.

Referring to FIG. 9, in operation 910, the display apparatus tracks a viewpoint of a driver by tracking 3D positions of both eyes of the driver. In an example, the display apparatus tracks the viewpoint of the driver by tracking a direction of a head of the driver, in addition to both the eyes of the driver.

In operation 920, the display apparatus predicts a transformation relation between the viewpoint of the driver and a virtual image displayed through the HUD based on the 3D positions of both the eyes of the user. The display apparatus predicts the transformation relation between the viewpoint of the driver and the virtual image through a geometric relation between the HUD and a camera tracking eye positions, for example, the 3D positions of both the eyes of the driver. The geometric relation between the HUD and the camera tracking the eye positions is calculated by measuring a rotation quantity and an actual distance between the HUD and the camera after the two devices are installed.

In operation 930, the display apparatus transforms the 3D virtual route based on the transformation relation.

The display apparatus tracks the viewpoint of the driver in real time, and estimates a lighting and/or a texture of a driving road including a driving lane, thereby rendering or displaying the 3D virtual route seamlessly.

FIGS. 10A and 10B illustrate an example of a 3D virtual route generated based on a driving environment model and an estimated position of a vehicle. The display apparatus generates a segmentation image as shown in FIG. 10A by classifying objects included in image data in semantic units. In the segmentation image of FIG. 10A, a region 1001 indicates a road, a region 1003 indicates a sidewalk, and a region 1005 indicates a building.

The display apparatus generates a 3D virtual route 1050 as shown in FIG. 10B by registering a driving environment model corresponding to a driving environment, a driving lane identified from the segmentation image, and a position of a vehicle in map information. The map information includes, for example, name and position information of XX university hospital, BB building, and OO coffee shop which is a destination of the vehicle.

Figure 11A:
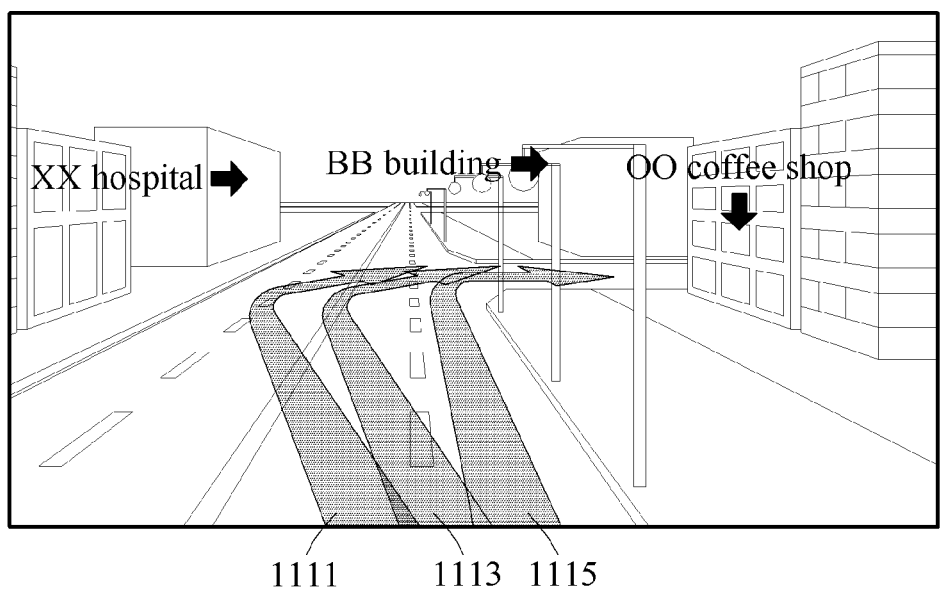
FIGS. 11A and 11B illustrate an example of a 3D virtual route transformed to match to a viewpoint of a driver.
Figure 11B:
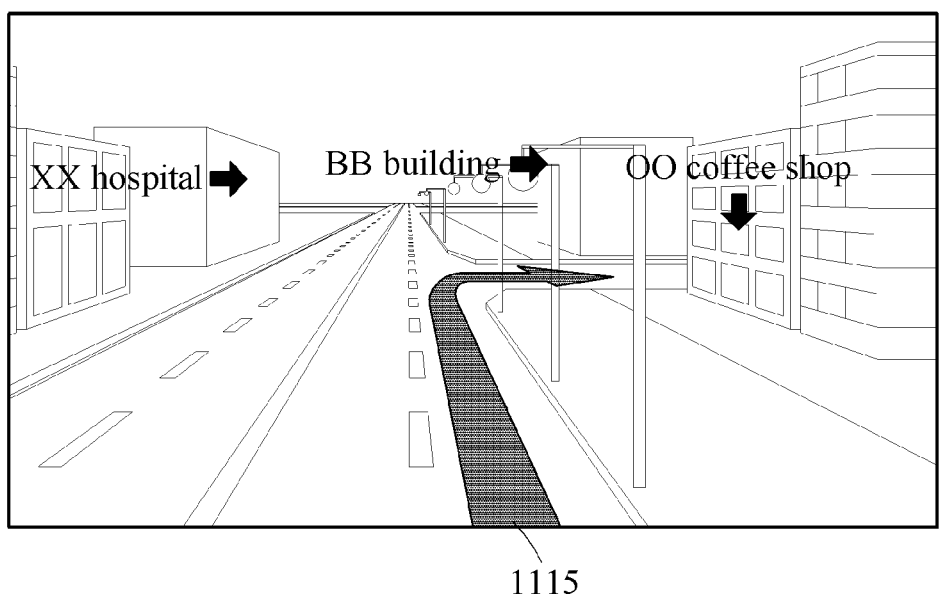

FIGS. 11A and 11B illustrate an example of a 3D virtual route transformed to match to a viewpoint of a driver. FIG. 11A illustrates 3D virtual routes 1111, 1113 and 1115 that are generated by the display apparatus. In an example, the display apparatus tracks the viewpoint of the driver by tracking 3D positions of both eyes of the driver using a second camera sensor that monitors the driver. The display apparatus obtains the 3D virtual route 1115 which is suitable for the viewpoint of the driver, as shown in FIG. 11B, by tracking the viewpoint of the driver and performing 3D registration between the 3D virtual routes and a driving road.

FIG. 12 illustrates an example of a process flow of an apparatus for displaying a virtual route. Referring to FIG. 12, a processing operation of a display apparatus 1200 is divided into a process of generating an AR object, for example, a 3D virtual route, by estimating a position of a vehicle with high speed and high precision using sensors 1211, 1213, 1215 and 1217 included in a sensor module 1210, and a process of rendering the AR object by sensing an environment of a driving road including a lighting and a texture and a viewpoint of a driver.

The sensor module 1210 includes, for example, a GPS sensor 1211, an IMU sensor 1213, an OBD sensor 1215, and a stereo camera sensor 1217. For example, the GPS sensor 1211 corresponds to a GPS sensor 1511 of FIG. 15, the IMU sensor 1213 corresponds to an IMU sensor 1513 of FIG. 15, the OBD sensor 1215 corresponds to an OBD sensor 1515 of FIG. 15, and the stereo camera sensor 1217 corresponds to a first camera sensor 1517 of FIG. 15.

In operation 1220, the display apparatus 1200 receives sensing data asynchronously from the sensors 1211, 1213, 1215 and 1217 having different sensing speeds and different accuracies. In operation 1225, the display apparatus 1200 measures an odometry based on image data acquired from the stereo camera sensor 1217. In operation 1240, the display apparatus 1200 estimates a position of a vehicle based on the sensing data and the measured odometry.

In operation 1230, the display apparatus 1200 generates a segmentation image by segmenting an image using the image data acquired from the stereo camera sensor 1217. In operation 1232, the display apparatus 1200 estimates depth values of objects included in the segmentation image based on the segmentation image and the odometry. In operation 1232, the display apparatus 1200 also identifies a driving lane, simultaneously with the depth value estimation.

To identify the driving lanes, the display apparatus 1200 generates virtual lanes using road markings extracted from the segmentation image and the image data. The display apparatus 1200 fits left and right boundary lines of the driving lane in the segmentation image, and disposes the left and right boundary lines in parallel at an equal interval, thereby generating the virtual lanes. The display apparatus 1200 identifies the driving lane of the vehicle by determining a relative position of the driving lane with respect to the virtual lanes based on the number of lanes of a driving road on which the vehicle is being driven. The "road markings" are markings provided on a surface of a road on which vehicles are driven, and include lines and road signs.

In operation 1234, the display apparatus 1200 generates a driving environment model, for example, a 3D road model, based on the identified driving lane and the depth values of the objects. In operation 1245, the display apparatus 1200 registers the driving environment model and the estimated position of the vehicle in map information. In operation 1250, the display apparatus 1200 generates a 3D virtual route.

In operation 1236, the display apparatus 1200 estimates a lighting and a texture of a region including the driving lane of the vehicle based on the segmentation image generated through the image segmentation or the image data. In operation 1280, the display apparatus 1200 tracks a viewpoint of a driver by tacking 3D positions of both eyes of the driver using a camera sensor 1219 included in a driver monitor. The camera sensor 1219 is, for example, a second camera sensor 1550 of FIG. 15. In operation 1285, the display apparatus 1200 predicts a transformation relation between the viewpoint of the driver and a virtual image including the 3D virtual route displayed through an HUD 1270 based on the 3D positions of both the eyes of the driver.

In operation 1260, the display apparatus 1200 renders the 3D virtual route by applying the transformation relation, the lighting, and the texture. The rendered 3D virtual route is displayed through the HUD 1270.

Figure 13:
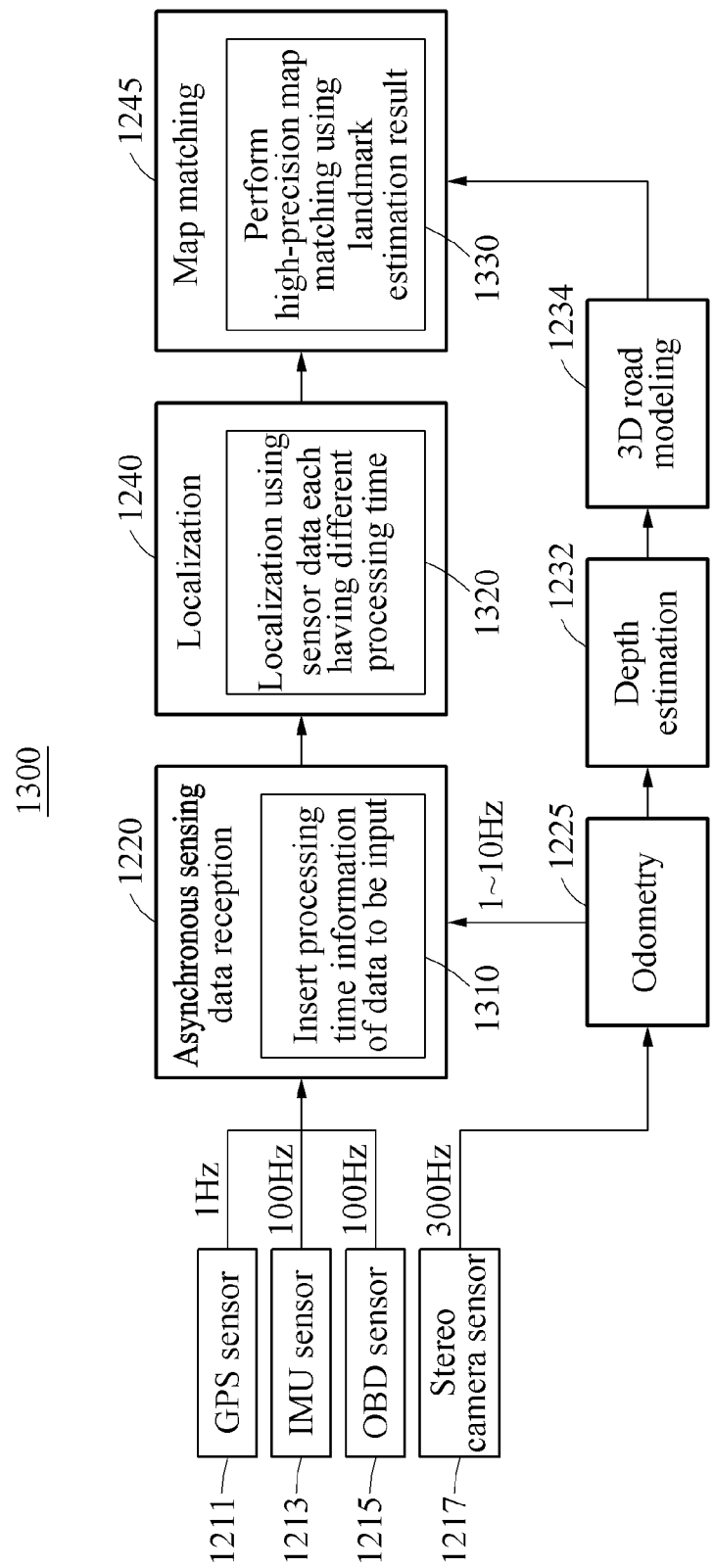
FIG. 13 illustrates an example of a data flow in an apparatus for displaying a virtual route.

FIG. 13 illustrates an example of a data flow in an apparatus for displaying a virtual route. Referring to FIG. 13, a diagram 1300 showing a flow of asynchronously received sensing data in the display apparatus is illustrated. In other examples, the order of the flow of asynchronously received sensing data may be changed or some of the operations omitted without departing from the spirit and scope of the illustrative examples described.

Sensing data of the GPS sensor 1211 is measured at a low frequency of, for example, 1 Hz, and is barely measured in a GPS shadow area. The sensing data of the GPS sensor 1211 includes an absolute route of a vehicle. Sensing data of the IMU sensor 1213 and the OBD sensor 1215 are measured at a high frequency of, for example, 100 Hz. However, measurement performances are relatively low. The sensing data of the IMU sensor 1213 and the OBD sensor 1215 include a relative route of the vehicle. Sensing data of the OBD sensor 1215 is measured at a low frequency of 1 to 10 Hz. However, a measurement performance is relatively high. The sensing data of the OBD sensor 1215 includes a relative route of the vehicle.

The display apparatus consumes a significant processing time, for example, 100 milliseconds (ms) to 1 second (s), to measure an odometry based on the image data acquired from the stereo camera sensor 1217, in operation 1225. Thus, a result of estimating a position of a vehicle based on the odometry corresponds to past position information obtained by adding the processing time to a time at which the image data is acquired.

In operation 1310, the display apparatus inserts, into each piece of the sensing data asynchronously input or received, information related to a processing time at which the corresponding piece of the sensing data is processed.

In operation 1320, the display apparatus estimates the position of the vehicle based on the sensing data, each including information related to a different processing time.

In operation 1330, the display apparatus performs high-precision map matching based on a result of estimating a landmark from the estimated position of the vehicle and the result of the 3D road modeling. Here, the landmark refers to an object described in a high-precision map, for example, traffic lights or traffic signs. In an example, "performing high-precision map matching based on a result of estimating a landmark" includes registering between a first landmark estimated from the result of the 3D road modeling and a second landmark in the high-precision map extracted at the estimated position of the vehicle. In an example, the registration between the landmarks is performed using a scheme of pairing a first landmark and a second landmark when a distance between the first landmark and the second landmark is at a minimum, or a scheme of paring a first landmark and a second landmark such that a total sum of distances between the pair of the first landmark and the second landmark is at a minimum.

In an example, the position of the vehicle is estimated by integrating the sensing data collected at various measurement times of the sensors. The display apparatus maintains a relatively high speed of rendering a 3D virtual route based on sensing data received from a high-speed sensor, and also secures an accuracy of the 3D virtual route based on sensing data received from a low-speed high-precision sensor.

Figure 14:
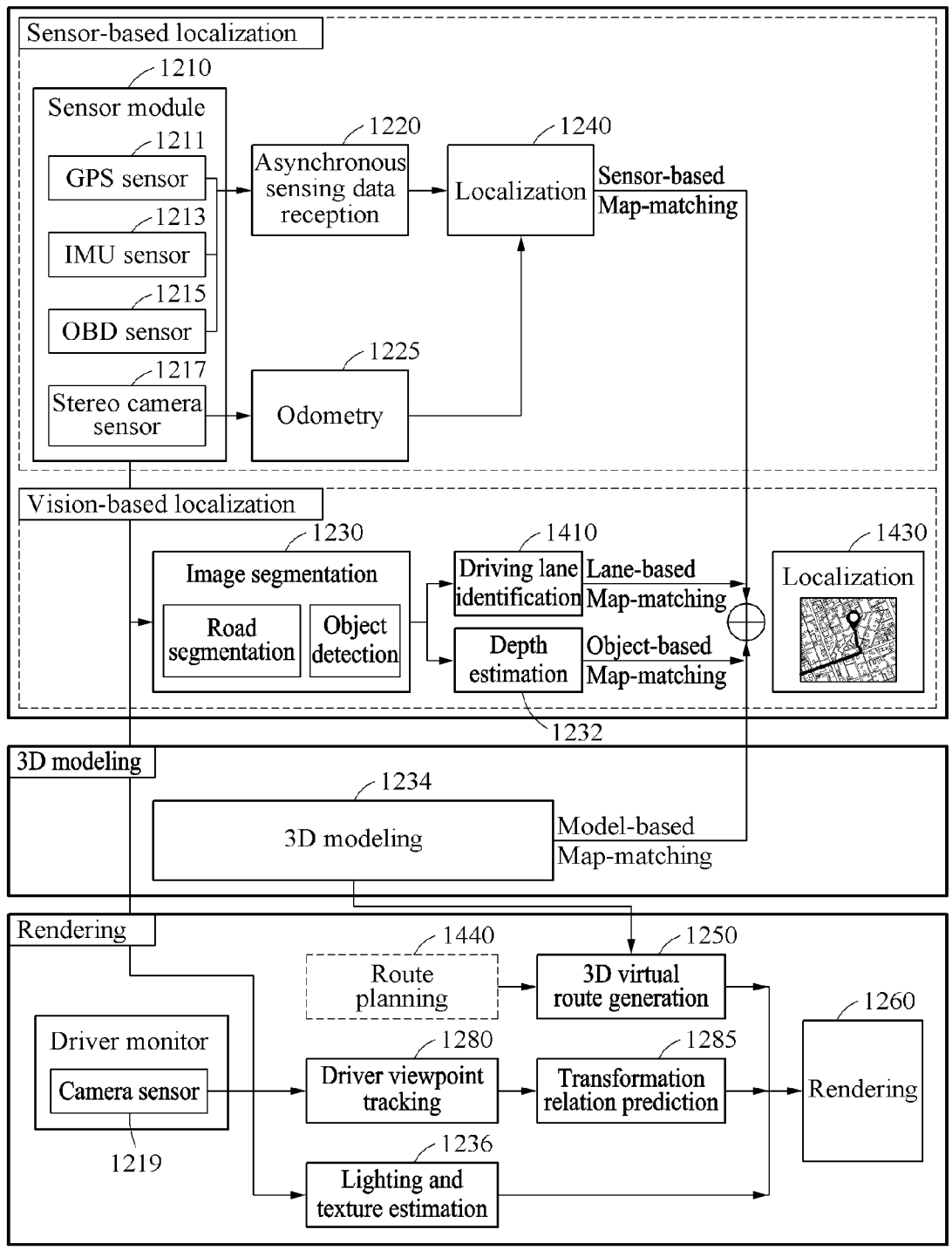
FIG. 14 illustrates an example of an operation of an apparatus for displaying a virtual route.

FIG. 14 illustrates an example of an operation of an apparatus for displaying a virtual route. Referring to FIG. 14, a diagram 1400 showing an operation flow of the display apparatus is illustrated. In addition to the description of FIG. 14 below, the descriptions of FIGS. 12 and 13 are also applicable to FIG. 14, and are incorporated herein by reference. Thus, the above description may not be repeated here for conciseness.

In an example, the operation of the display apparatus is divided into a sensor-based localization process, a vision-based localization process, a 3D modeling process, and a rendering process.

In operation 1430, the display apparatus expresses a position of a vehicle on a map by performing map matching based on a position of a vehicle obtained through the sensor-based localization process, a position of a driving lane obtained by identifying a driving lane of the vehicle in operation 1410 of the vision-based localization process, positions of objects obtained by estimating depth values of the objects in operation 1232 of the vision-based localization process, and a 3D model, for example, a 3D driving environment model, obtained in the 3D modeling process. In this example, 3D modeling operation 1234 is performed by extracting a region of a landmark, for example, traffic lights or signs, from a segmentation image generated through image segmentation operation 1230, and performing 3D modeling based on a 3D depth value of the landmark region.

In operation 1250, the display apparatus generates a 3D virtual route by reflecting a route planned in operation 1440 based on origin information and destination information input into a navigation system. The display apparatus renders the generated 3D virtual route.

A time used to calculate the odometry in operation 1225, a time used to identify the driving lane in operation 1410, and a time used to estimate the depth values in operation 1232 are dependent on a computing power; however, in general, correspond to a speed of below 30 Hz which is an input speed of a camera. The odometry calculated in operation 1225 senses relative position information and posture information more intermittently than the IMU sensor 1213, but provides a relatively accurate measurement. The display apparatus estimates high-precision sensing information with a margin of error less than or equal to 1 m through registration between the information obtained through operation 1410 of identifying the driving lane and operation 1232 of estimating the depth values and the map. Further, the display apparatus transforms a virtual object, for example, the 3D virtual route, to match accurately to a road on which the vehicle is being driven in reality through driver head or gaze tracking even when a viewpoint of a driver is changed. For natural 3D object rendering, the display apparatus estimates a lighting and a texture of a driving road including the driving lane of the vehicle and applies the lighting and the texture to the 3D virtual route.

In an example, high-precision AR navigation information is rendered fast to match to the driving environment and the viewpoint of the driver, whereby natural information not interrupting driving is provided.

FIG. 15 illustrates an example of an apparatus for displaying a virtual route. Referring to FIG. 15, an apparatus 1500 for displaying a virtual route, hereinafter, the "display apparatus" 1500, includes a sensor module 1510, the memory 1520, a processor 1530, and a display 1540. The display apparatus 1500 further includes the second camera sensor 1550 and a communication interface 1560. The sensor module 1510, the memory 1520, the processor 1530, the display 1540, the second camera sensor 1550, and the communication interface 1560 communicate with each other through a communication bus 1505.

The sensor module 1510 includes sensors 1511, 1513, 1515 and 1517 configured to sense sensing data such as images including a position of a vehicle, a posture of the vehicle, and a driving environment of the vehicle. The sensor module 1510 includes, for example, the GPS sensor 1511, the IMU sensor 1513, the OBD sensor 1515, and the first camera sensor 1517. The GPS sensor 1511 measures an absolute position or an absolute route of the vehicle indicated as GPS coordinates. The IMU sensor 1513 measures a relative route of the vehicle including a travel distance. The OBD sensor 1515 measures a driving distance of the vehicle. The first camera sensor 1517 captures image data including the driving environment of the vehicle. In an example, the first camera sensor 1517 is a complementary metal-oxide semiconductor (CMOS) image sensor (CIS) or a vision sensor. In an example, the first camera sensor 1517 is a mono camera or a stereo camera. Although not shown in the drawings, the sensor module 1510 may further include, for example, a radar, a LIDAR, an ultrasonic sensor, and an infrared camera. In an example, the display apparatus 1500 obtains a depth value using any one or any combination of an SLAM scheme and a stereo matching scheme using the radar, the LIDAR or the stereo camera.

The sensing data sensed by the sensors 1511, 1513, 1515 and 1517 are sampled separately for each of the sensors 1511, 1513, 1515 and 1517.

In an example, the memory 1520 stores map information and navigation information received through the communication interface 1560. The memory 1520 also stores the sensing data sensed by the sensors included in the sensor module 1510, and a 3D virtual route generated by the processor 1530.

The processor 1530 estimates a position of a vehicle based on the sensing data received asynchronously from the sensors 1511, 1513, 1515 and 1517 included in the sensor module 1510. The processor 1530 estimates the position of the vehicle by determining current position information, posture information, and direction information of the vehicle based on the sensing data.

The processor 1530 generates the 3D virtual route by registering a driving environment model corresponding to a driving environment of the vehicle and the position of the vehicle in map information. The processor 1530 inserts, into each piece of the sensing data, information related to a processing time at which the corresponding piece of the sensing data is processed, and estimates the position of the vehicle based on the sensing data, each including information related to a different processing time.

The processor 1530 estimates a first position of the vehicle based on first sensing data received at a first time from one of the sensors 1511, 1513, 1515 and 1517. The processor 1530 updates the first position of the vehicle to a second position based on second sensing data received at a second time from the sensors 1511, 1513, 1515 and 1517 including the one sensor. The processor 1530 updates the second position of the vehicle to a third position based on third sensing data received at a third time from the sensors 1511, 1513, 1515 and 1517.

The processor 1530 measures an odometry based on image data acquired from the first camera sensor 1517, and estimates the position of the vehicle based on the sensing data and the odometry. The processor 1530 estimates the position of the vehicle based on one piece of the sensing data, except for the image data, and corrects the position of the vehicle based on the odometry.

The processor 1530 generates a segmentation image based on image data acquired from the first camera sensor 1517, and detects objects included in the segmentation image. The processor 1530 generates the driving environment model based on depth values of the objects and a driving lane of the vehicle identified from the objects. The processor 1530 generates the 3D virtual route by registering the position of the vehicle, the driving lane of the vehicle, and the depth values of the objects in the map information.

The processor 1530 estimates a lighting and a texture of a region including the driving lane of the vehicle from the segmentation image generated based on the image data acquired from the first camera sensor 1517. The processor 1530 transforms the 3D virtual route based on the lighting and the texture.

The display 1540 displays the 3D virtual route generated by the processor 1530. The display 1540 is, for example, an HUD.

The second camera sensor 1550 tracks a viewpoint of a driver of the vehicle. In this example, the processor 1530 transforms the 3D virtual route to match to the viewpoint of the driver of the vehicle, and displays the transformed 3D virtual route through the display 1540.

In an example, the processor 1530 tracks the viewpoint of the driver of the vehicle by tracking 3D positions of both eyes of the driver. The processor 1530 predicts a transformation relation between the viewpoint of the driver and a virtual image displayed through the HUD based on the 3D positions of both the eyes of the driver. The processor 1530 transforms the 3D virtual route based on the transformation relation.

The communication interface 1560 receives the navigation information and/or the map information corresponding to a road on which the vehicle is being driven. In an example, the communication interface 1560 receives an input image captured outside the display apparatus 1500.

Further, the processor 1530 performs the method described with reference to FIGS. 1 through 14 or an algorithm corresponding to the method. The processor 1530 executes a program, and controls the display apparatus 1500. Codes of the program codes to be executed by the processor 1530 are stored in the memory 1520. Further details regarding the processor 1530 is provided below.

In addition, the memory 1520 stores a variety of information generated during a processing operation of the processor 1530. The memory 1520 stores a variety of data and programs. The memory 1520 includes a volatile memory or a non-volatile memory. The memory 1520 includes a large-capacity storage medium such as a hard disk to store the variety of data. Further details regarding the memory 1520 is provided below.

The display apparatuses 1200 and 1500, and other apparatuses, units, modules, devices, and other components described herein with respect to FIGS. 12 and 15 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 and 12-14 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after gaining a thorough understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of displaying a virtual route, the method comprising:
   estimating first and second positions of a vehicle based on sensing data received from a first sensor and a second sensor;
   generating a three-dimensional (3D) virtual route by registering, in map information, a driving environment model corresponding to a driving environment of the vehicle and the first and second positions of the vehicle; and
   outputting the 3D virtual route,
   wherein a sensing speed of the first sensor and a sensing speed of the second sensor are not synchronized.

2. The method of claim 1, wherein the estimating comprises estimating the first and second positions without synchronizing the sensing speeds of the first sensor and the second sensor.

3. The method of claim 1, wherein a sensing speed of the first sensor is less than a sensing speed of the second sensor.

4. The method of claim 1, wherein the estimating comprises:
   estimating the first position based on first sensing data received from the first sensor; and
   estimating the second position of the vehicle based on second sensing data received from the second sensor.

5. The method of claim 4, further comprising updating the first position of the vehicle to the second position in response to the estimating of the second position.

6. The method of claim 1, wherein the first and second sensors comprise any two of a global positioning system (GPS) sensor, an inertial measurement unit (IMU) sensor, an on-board diagnostics (OBD) sensor, and a camera sensor.

7. The method of claim 1, wherein the sensing data are sampled separately for each of the first and second sensors.

8. The method of claim 1, wherein the estimating comprises:
inserting, into each piece of the sensing data, information related to a processing time at which the corresponding piece of the sensing data is processed; and
estimating the first and second positions of the vehicle based on the sensing data, each including the information related to the processing time.

9. The method of claim 1, wherein the estimating comprises:
estimating the first position of the vehicle based on first sensing data received at a first time from the first sensor;
updating the first position of the vehicle to the second position based on second sensing data received at a second time from the first sensor or the second sensor; and
updating the second position of the vehicle to a third position based on third sensing data received at a third time from the first sensor, or the second sensor, or a third sensor.

10. The method of claim 1, further comprising:
measuring an odometry based on image data acquired from a camera sensor among the first and second sensors,
wherein the estimating comprises estimating either one or both of the first and second positions of the vehicle based on the odometry.

11. The method of claim 10, wherein the estimating based on the sensing data and the odometry comprises:
estimating the either one or both of the first and second positions of the vehicle based on either one piece of the sensing data, except for the image data; and
correcting the either one or both of the first and second positions of the vehicle based on the odometry.

12. The method of claim 1, wherein the generating of the 3D virtual route comprises:
generating a segmentation image based on image data acquired from a camera sensor among the sensors;
detecting objects included in the segmentation image;
generating the driving environment model based on depth values of the objects and a driving lane of the vehicle identified from the objects; and
generating the 3D virtual route by registering, in the map information, the driving environment model and the first and second positions of the vehicle.

13. The method of claim 1, further comprising:
transforming the 3D virtual route to match to a viewpoint of a driver of the vehicle,
wherein the outputting comprises displaying the transformed 3D virtual route.

14. The method of claim 13, wherein the outputting of the transformed 3D virtual route comprises displaying the transformed 3D virtual route through a head-up display (HUD) of the vehicle.

15. The method of claim 13, wherein the transforming comprises:
tracking the viewpoint of the driver by tracking 3D positions of both eyes of the driver;
predicting a transformation relation between the viewpoint of the driver and a virtual image displayed through the HUD based on the 3D positions of both the eyes of the user; and
transforming the 3D virtual route based on the transformation relation.

16. A non-transitory computer-readable storage medium storing instructions that, when executed by one or more processors, configure the one or more processors to perform the method of claim 1.

17. An apparatus for displaying a virtual route, the apparatus comprising:
a first sensor and a second sensor configured to sense sensing data;
one or more processors configured to
estimate first and second positions of a vehicle based on the sensing data, and
generate a three-dimensional (3D) virtual route by registering, in map information,
a driving environment model corresponding to a driving environment of the vehicle and
the first and second positions of the vehicle; and
a display configured to display the 3D virtual route,
wherein a sensing speed of the first sensor and a sensing speed of the second sensor are not synchronized.

18. The apparatus of claim 17, wherein the one or more processors are further configured to estimate the first and second positions without synchronizing the sensing speeds of the first sensor and the second sensor.

19. The apparatus of claim 17, wherein a sensing speed of the first sensor is less than a sensing speed of the second sensor.

20. The apparatus of claim 17, wherein the one or more processors are further configured to estimate the first position based on first sensing data received from the first sensor; and estimate the second position of the vehicle based on second sensing data received from the second sensor.

21. The apparatus of claim 20, further the one or more processors are further configured to update the first position of the vehicle to the second position in response to the estimating of the second position.

22. The apparatus of claim 17, wherein the first and second sensors comprise any two of:
a global positioning system (GPS) sensor configured to measure an absolute route of the vehicle;
an inertial measurement unit (IMU) sensor configured to measure a relative route of the vehicle;
an on-board diagnostics (OBD) sensor configured to measure a driving distance of the vehicle; and
a camera sensor configured to capture image data including the driving environment of the vehicle.

23. The apparatus of claim 22, wherein the sensing data are sampled separately for each of the first and second sensors.

24. The apparatus of claim 17, wherein the one or more processors are further configured to insert, into each piece of the sensing data, information related to a processing time at which the corresponding piece of the sensing data is processed, and to estimate the first and second positions of the vehicle based on the sensing data, each including the information related to the processing time.

25. The apparatus of claim 17, wherein the one or more processors are further configured to estimate the first position of the vehicle based on first sensing data received at a first time from the first sensor, to update the first position of the vehicle to the second position based on second sensing data received at a second time from the first sensor or the second sensor, and to update the second position of the vehicle to a third position based on third sensing data received at a third time from the first sensor, or the second sensor, or a third sensor.

26. The apparatus of claim 17, wherein the one or more processors are further configured to measure an odometry based on image data acquired from a camera sensor among the first and second sensors, and to estimate either one or both of the first and second positions of the vehicle based on the odometry.

27. The apparatus of claim 26, wherein the one or more processors are further configured to estimate the either one or both of the first and second positions of the vehicle based on either one piece of the sensing data, except for the image data, and to correct the either one or both of the first and second positions of the vehicle based on the odometry.

28. The apparatus of claim 17, wherein the one or more processors are further configured to generate a segmentation image based on image data acquired from a camera sensor among the sensors, to detect objects included in the segmentation image, to generate the driving environment model based on depth values of the objects and a driving lane of the vehicle identified from the objects, and to generate the 3D virtual route by registering the driving environment model and the first and second positions of the vehicle in the map information.

29. The apparatus of claim 17, further comprising:
a second camera sensor configured to track a viewpoint of a driver of the vehicle,
wherein the one or more processors are further configured to transform the 3D virtual route to match the viewpoint of the driver of the vehicle, and to output the transformed 3D virtual route through the display.

30. The apparatus of claim 29, wherein the display comprises a head-up display (HUD).

31. The apparatus of claim 30, wherein the one or more processors are further configured to track the viewpoint of the driver of the vehicle by tracking 3D positions of both eyes of the driver, to predict a transformation relation between the viewpoint of the driver and a virtual image displayed through the HUD based on the 3D positions of both the eyes of the user, and to transform the 3D virtual route based on the transformation relation.

32. The apparatus of claim 17, further comprising a memory storing instructions, wherein execution of the instructions by the one or more processors configure the one or more processors to perform the estimating of the first and second positions of the vehicle and the generating of the 3D virtual route.

\* \* \* \* \*